United States Patent
Ou

(10) Patent No.: US 10,023,776 B2
(45) Date of Patent: Jul. 17, 2018

(54) PREPARATION OF A SELF-BONDING THERMOPLASTIC ELASTOMER USING AN IN SITU ADHESION PROMOTER

(75) Inventor: Duan Li Ou, Northboro, MA (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 1479 days.

(21) Appl. No.: 12/336,630

(22) Filed: Dec. 17, 2008

(65) Prior Publication Data

US 2009/0162664 A1  Jun. 25, 2009

Related U.S. Application Data

(60) Provisional application No. 61/016,063, filed on Dec. 21, 2007.

(51) Int. Cl.

| *C08L 75/04* | (2006.01) |
|---|---|
| *C08L 83/08* | (2006.01) |
| *C09J 175/04* | (2006.01) |
| *C08L 29/04* | (2006.01) |
| C08G 77/44 | (2006.01) |
| C08K 5/17 | (2006.01) |
| C08K 5/544 | (2006.01) |
| C08G 77/04 | (2006.01) |
| C08G 77/26 | (2006.01) |

(52) U.S. Cl.
CPC .............. *C09J 175/04* (2013.01); *C08L 29/04* (2013.01); *C08L 83/08* (2013.01); *C08G 77/045* (2013.01); *C08G 77/26* (2013.01); *C08G 77/44* (2013.01); *C08K 5/17* (2013.01); *C08K 5/544* (2013.01); *C08L 75/04* (2013.01); *C08L 2666/14* (2013.01); *C08L 2666/22* (2013.01); *C08L 2666/44* (2013.01); *Y10T 428/3154* (2015.04); *Y10T 428/31551* (2015.04); *Y10T 428/31612* (2015.04); *Y10T 428/31663* (2015.04)

(58) Field of Classification Search
None
See application file for complete search history.

(56) References Cited

U.S. PATENT DOCUMENTS

| 3,886,226 | A |   | 5/1975 | Mori et al. |
|---|---|---|---|---|
| 4,822,835 | A |   | 4/1989 | Close |
| 4,956,240 | A |   | 9/1990 | Williams et al. |
| 5,252,668 | A |   | 10/1993 | Asai et al. |
| 5,925,425 | A | * | 7/1999 | Nelson ............... B29C 45/1704 293/128 |
| 6,228,912 | B1 | * | 5/2001 | Campbell et al. ............ 524/100 |
| 6,503,984 | B2 |   | 1/2003 | Johnson et al. |
| 6,506,715 | B1 | * | 1/2003 | Schultz et al. ................. 510/189 |
| 6,723,400 | B1 | * | 4/2004 | Ishio et al. .................... 428/35.7 |
| 6,933,345 | B1 |   | 8/2005 | Lichtenhan et al. |
| 2003/0040377 | A1 | * | 2/2003 | Tzivanis et al. .............. 473/371 |
| 2004/0126574 | A1 |   | 7/2004 | Kawaguchi et al. |
| 2005/0170122 | A1 |   | 8/2005 | Fahrenholz et al. |
| 2006/0135693 | A1 |   | 6/2006 | Crafton et al. |

FOREIGN PATENT DOCUMENTS

| EP | 0 544 265 A1 | 6/1993 |
|---|---|---|
| EP | 1261664 | 9/2004 |
| WO | 01/55257 | 8/2001 |

OTHER PUBLICATIONS

Liu, H. and Zheng, S. "Polyurethane Networks Nanoreinforced by Polyhedral Oligomeric Silsesquioxane", Macromolecular Rapid Communications 2006, 26(3), 196-200.*
Pinto, U. A. et al., "Mechanical properties of thermoplastic polyurethane elastomers with mica and aluminum trihydrate", Eur. Polym. J. 2001, 37, 1935-1937.*

* cited by examiner

*Primary Examiner* — Richard A Huhn
(74) *Attorney, Agent, or Firm* — McDonnell Boehnen Hulbert & Berghoff LLP

(57) ABSTRACT

The invention describes compositions that include amine-containing silsesquioxane or an amine-containing alkyltrialkoxysilane and a thermoplastic elastomer as well as methods of preparation of the compositions that are useful as self-bonding adhesives for various substrates.

10 Claims, No Drawings

PREPARATION OF A SELF-BONDING THERMOPLASTIC ELASTOMER USING AN IN SITU ADHESION PROMOTER

CROSS REFERENCE TO RELATED APPLICATIONS

This application claims priority to U.S. Provisional Patent Application No. 61/016,063, filed Dec. 21, 2007, the entire content of which is hereby incorporated by reference in its entirety.

FIELD OF THE INVENTION

The invention relates generally to a method for making a self-bonding thermoplastic composition with an in-situ adhesion promoter, compositions thereof, and articles including compositions thereof.

BACKGROUND OF THE INVENTION

Thermoplastic elastomers traditionally have had poor adhesion to surfaces of various types. Thermoplastic vulcanizates (TPV), a subset of thermoplastic elastomers (TPE), often result in peel strengths of only 0.5 to 4.0 pounds per linear inch (pli) between the TPV and substrate after melt processing the TPV to the substrate.

Typically, when a polymer and a substrate exhibit poor adhesion toward each other, the problem can be attributed to poor wetting of the substrate with the polymer or a lack of interactions between the surface and the polymer.

Therefore, a need exists for thermoplastic elastomers that adhere to a substrate surface and, in particular, have increased peel strengths that can withstand normal use of the material

BRIEF SUMMARY OF THE INVENTION

The present invention surprisingly provides compositions that include amine-containing silsesquioxane, or an amine-containing siloxane or an amine-containing alkyltrialkoxysilane and a thermoplastic elastomer as well as methods of preparation that are useful as self-bonding thermoplastic elastomers for various substrates.

In one aspect, the composition thermoplastic elastomer is a thermoplastic vulcanite.

In another aspect, the amine-containing silsesquioxane includes $RSiO_{3/2}$ units wherein R is an alkyl group terminated with amine functionality. Suitable alkyl groups include C1 to C6 alkyl groups that can be branched or unbranched.

In still another aspect, R is branched or unbranched alkyl group, wherein one or more carbon atoms of the alkyl chain are replaced with at least one nitrogen atom to provide a primary amine, secondary amine or tertiary amine, with the proviso that when two or more nitrogen atoms are within the alkyl heteroatom chain, two nitrogen atoms are not adjacent to each other. Suitable examples include alkyl heteroatom chains such as $NH_2(R_{22}(X)R_{33})_n-$, $NHR_{44}(R_{22}(X)R_{33})_n-$, $NR_{44}R_{55}(R_{22}(X)R_{33})_n-$, or $(R_{22}(X)R_{33})_n-$, wherein $R_{22}$ and $R_{33}$ are each individually a branched or unbranched alkyl group having from one to six carbon atoms; X can be a nitrogen atom or a branched or unbranched alkyl group having from one to six carbon atoms, wherein the nitrogen atom is $NR_{66}$, wherein $R_{66}$ is a branched or unbranched alkyl group having from one to six carbon atoms or a hydrogen atom; n is an integer from 1 to about 25, from about 1 to about 10 or from about 1 to about 5; and $R_{44}$ and $R_{55}$ are each individually a hydrogen atom, or a branched or unbranched alkyl group having from one to six carbon atoms, provided at least one or P44 and $R_{55}$ are not both hydrogen atoms.

In one particular embodiment, one or more of the R groups is $NH_2CH_2CH_2NHCH_2CH_2CH_2-$.

In one embodiment, the alkyl portion (R) of the alkyltrialkoxysilane includes the amine functionality. R, of the alkyltrialkoxysilane, is as defined above.

Suitable amine containing siloxanes include those having a formula (I) of:

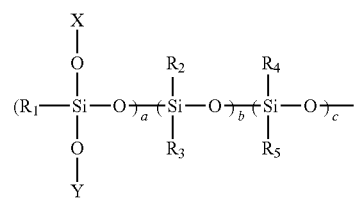

wherein a is an integer from about 1 to about 3,000;
wherein b is an integer from about 1 to about 3,000;
wherein c is an integer from about 1 to about 3,000;
wherein $R_1$ is a branched or unbranched C1 to C6 hydrocarbon;
wherein $R_2$ and $R_3$ are each independently a branched or unbranched C1 to C6 hydrocarbon;
wherein at least one of $R_4$ and $R_5$ are each independently a branched or unbranched C1 to C6 hydrocarbon substituted with $NH_2$, $NHR_6$ or $NR_6R_7$ or a branched or unbranched C1 to C6 hydrocarbon, provided at least one or P4 or $R_5$ is substituted with $NH_2$, $NHR_6$ or $NR_6R_7$;
wherein $R_6$ and $R_7$ are each independently a branched or unbranched C1 to C6 hydrocarbon; and wherein each X and Y, independently, is a covalent bond, a Si atom, $R_9$ or a hydrogen atom, wherein $R_8$ is a branched or unbranched C1 to C6 hydrocarbon, where the Si atom can be attached to a oxygen atom, $R_8$ or $R_4$ as defined above.

In certain embodiments, a is an integer from about 1 to about 3,000, from about 1 to about 2,000, from about 1 to about 1,000, from about 1 to about 500, from about 1 to about 250, from about 1 to about 100, from about 1 to about 50, and from about 1 to about 25.

In certain embodiments, b is an integer from about 1 to about 3,000, from about 1 to about 2,000, from about 1 to about 1,000, from about 1 to about 500, from about 1 to about 250, from about 1 to about 100, from about 1 to about 50, and from about 1 to about 25.

In certain embodiments, c is an integer from about 1 to about 3,000, from about 1 to about 2,000, from about 1 to about 1,000, from about 1 to about 500, from about 1 to about 250, from about 1 to about 100, from about 1 to about 50, and from about 1 to about 25.

In certain aspects, a+b+c equals at least 2 to about 6,000, provided that c is at least 1. In other aspects, a+b+c equals from about 2 to about 5,000, from about 2 to about 4,000, from about 2 to about 3,000, from about 2 to about 2,000, from about 2 to about 1,000, from about 2 to about 500, from about 2 to about 250, from about 2 to about 100, from about 2 to about 50 and from about 2 to about 25, provided c is at least 1. In certain aspects a+b+c equals at least 3 to about 6,000, wherein each of a, b, and c is at least 1. Therefore, the ranges include from about 3 to about 5,000, from about 3 to about 4,000, from about 3 to about 3,000, from about 3 to about 2,000, from about 3 to about 1,000, from about 3 to about 500, from about 3 to about 250, from about 3 to about 100, from about 3 to about 50 and from about 3 to about 25, again, provided each of a, b and c is at least 1.

A suitable example of formula I is Momentive SF1706, which is a copolymer of methylsilsesquioxane, polydimethylsiloxane and poly(ethylaminopropyl)methysiloxane.

In another embodiment, the amino group of the silsesquioxane, or siloxane or alkyltrialkyloxysilane is a primary amine, a secondary amine or a tertiary amine. In particular, the amino group is at the terminal end of the alkyl group.

Suitable thermoplastic elastomers useful in the self-bonding adhesives of the invention include, but are not limited to polyurethanes, ethyl vinyl alcohols, polyvinylidene fluoride, etc.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

The present invention provides compositions that include amine-containing silsesquioxane or an amine-containing alkyltrialkoxysilane and a thermoplastic elastomer as well as method of preparation that are useful as self-bonding adhesives for various substrates. One advantage of the present invention is the ease of preparation. The thermoplastic elastomer and amine-containing silsesquioxane and/or amine-containing alkyltrialkoxysilane (collectively known as in-situ adhesion promoters (IAP) can simply be mixed together and extruded, coated or placed on a substrate. The substrate can then be further processed with yet another substrate to form a laminate wherein the self-bonding adhesive bonds the two substrates to each other. The use of the self-bonding adhesives of the invention advantageously provide improved bond strength of greater than 20 ppi when compared to samples prepared without the IAP.

In the specification and in the claims, the terms "including" and "comprising" are open-ended terms and should be interpreted to mean "including, but not limited to . . . " These terms encompass the more restrictive terms "consisting essentially of" and "consisting of."

The phrase "thermoplastic elastomer" are used herein is known in the art and is intended to include those polymer blends or compounds which, above its melt temperature, exhibits a thermoplastic character that enables it to be shaped into a fabricated article and which, within it's design temperature range, possesses elastomeric behavior without cross-linking during fabrication. This process is reversible and the products can be reprocessed and remolded.

Thermoplastic elastomers (TPE), sometimes referred to as thermoplastic rubbers, are a class of copolymers or a physical mix of polymers (usually a plastic and a rubber), which consist of materials with both thermoplastic and elastomeric properties. While most elastomers are thermosets (thermoplastic vulcanites, TPV), thermoplastics are in contrast relatively easy to use in manufacturing, for example, by injection molding. TPEs show both advantages typical of rubbery materials and plastic materials. The principal difference between thermoset elastomers and thermoplastic elastomers is the type of crosslinking bond in their structures. In fact, crosslinking is a critical structural factor, which contributes to impart high elastic properties. The crosslink in thermoset polymers is a covalent bond created during the vulcanization process.

On the other hand, crosslinking (if present) in thermoplastic elastomer polymers is a weaker dipole or hydrogen bond or takes place in only in one of the phases of the material.

There are six generic classes of TPEs generally considered to exist that are commercially available. They are styrenic block copolymers, polyolefin blends, elastomeric rubbers (melt processable rubber), thermoplastic polyurethanes, thermoplastic copolyesters and thermoplastic polyamides. Examples include thermoplastic polyurethanes (TPU), polyvinylidene fluoride and ethyl vinyl alcohol polymers.

The phrase "thermoplastic vulcanizates", or TPV's, as used herein are known in the art and are intended to include a subclass of TPEs that contain a crosslinked rubber phase dispersed within a thermoplastic polymer phase. TPV's offer many of features of crosslinked rubbers, coupled with the processability of thermoplastic polymers.

Examples of suitable TPV's include, but are not limited to PP EPDM copolymers, e.g., Santoprene®

Throughout the specification, where the term thermoplastic elastomer (TPE) is used, it is intended to include both thermoplastic elastomers as well as thermoplastic vulcanizates unless otherwise noted.

The term "silsesquioxane" as used herein is known in the art and is a generic name showing a compound in which each silicon atom is bonded to three oxygen atoms and each oxygen atom is bonded to two silicon atoms. In the present invention, this term is used as a general term of a silsesquioxane structure.

In an embodiment, the in situ adhesion promoter includes an amine-containing alkyltrialkoxysilane or silsesquioxane. The phrase "amine-containing silsesquioxane" as used herein is known in the art and is intended to include silicon containing materials of the formula $RSiO_{3/2}$ wherein R is an alkyl group that includes an amine (amino) functionality. In particular, the R group can be terminated with amine functionality. Suitable R groups include C1 through C6 hydrocarbon chains that can be branched or unbranched. Examples of suitable hydrocarbon chains, are for example but not limited to, methyl, ethyl, or propyl groups. Commercial suppliers of suitable amine-containing silsesquioxanes include Gelest and Degussa.

Commercial suppliers of suitable amine-containing alkyltrialkoxysilanes include Momentive, Dow Corning, and Degussa. Examples of commercial products include Silquest®1100 (Momentive), Dynasylan® AMMO, Dynasylan® AMEO, Dynasylan® DAMO (Degussa); Z-6011 silane and Z6020 silane (Dow Corning).

Commercial suppliers of suitable amine-containing silsesquioxanes include Momentive and Degussa. Examples of commercial products include SF1706 (Momentive siloxane fluid), Hydrosil®1151, Hydrosil®2627, Hydrosil®2776, Hydrosil®2909 and Hydrosil®1146 (Degussa).

Aminopropyl silsesquioxane is obtained from Degussa under the trade name of Hydrosil®1151. Aminopropyl co alkyl silsesquioxane is obtained from Degussa under the trade name of Hydrosil®2627

Typically, the silsesquioxane has a amine-containing alkyl content of at least about 30.0% by weight. The in situ adhesion promoter can include $R_2SiO_{2/2}$ units, $R_3SiO_{1/2}$ units and $SiO_{4/2}$ units, wherein R is an alkyl radical, alkoxy radical, phenyl radical, or any combination thereof. In an embodiment, the amine-containing silsesquioxane can include pre-hydrolyzed silsesquioxane prepolymers, monomers, or oligomers.

A suitable example of an amine-containing silsesquioxane is aminopropyl silsesquioxane.

The term "amine-containing alkyltrialkoxysilane" is intended to include those compounds having the general formula:

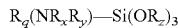

$$R_q(NR_xR_y)—Si(OR_z)_3$$

wherein $R_q$ is a C1 through C6 hydrocarbon chain that can be branched or unbranched;

$R_x$ and $R_x$, each independently, can be a hydrogen atom or a C1 through C6 hydrocarbon chain that can be branched or unbranched; and each $R_z$, independently, can be a hydrogen atom or a C1 through C6 hydrocarbon chain that can be branched or unbranched.

A suitable example of an amine-containing alkyltrialkoxysilane is aminopropyltrialkoxysilane, wherein the trialkoxy portion of the silane can include methyl or ethyl alkoxides.

In addition, the silsesquioxane or silane can have desirable processing properties, such as viscosity. In particular, the viscosity can provide for improved processing in situ, such as during formulation mixing or extrusion. For example, the viscosity of the silsesquioxane or silane can be about 1.0 centistokes (cSt) to about 8.0 cSt, such as about 2.0 cSt to about 4.0 cSt, or about 3.0 cSt to about 7.0 cSt. In an example, the viscosity of the silsesquioxane or silane can be up to about 100.0 cSt, or even greater than about 100.0 cSt.

Generally, the in situ adhesion promoter is present in an effective amount to provide an adhesive formulation which bonds to substrates; it is self bonding. In an embodiment, an "effective amount" is about 0.1 weight % to about 5.0 weight %, such as about 1.0 wt % to about 3.0 wt %, or about 0.2 wt % to about 1.0 wt %, or about 0.5 wt % to about 1.5 wt % of the total weight of the thermoplastic elastomer.

Typically, the addition of the in situ adhesion promoter to the composition is detectable using nuclear magnetic resonance (NMR). The $^{29}Si$ NMR spectra of the silicon formulation has two groups of distinguished peaks at about −53 ppm to about −57 ppm and about −62 ppm to about −65 ppm, which corresponds to $RSiO_{2/2}$ (OH) units and $RSiO_{3/2}$ units, respectively.

The phrases "self-bonding composition" or "self-bonding formulation" used interchangeably throughout the specification refer to and are intended to include compositions that have an in situ adhesion promoter (IAP) and a TPE.

For example, polymeric ethyl vinyl alcohol (EVOH) includes hydroxyl groups throughout the polymeric structure that can react with the in situ adhesion promoter. The self-bonding composition then can further react with a substrate that includes a group suitable for attachment, such as a hydroxyl group, an amine, a carboxylic acid, etc. In another embodiment, thermoplastic polyurethanes have residual isocyanates that can react with the amine functionality of the in situ adhesion promoter, while the LAP can then further react with a hydroxyl on the surface of a substrate.

The phrase "polymeric material with reactive functionality" as used herein is intended to include substrates that inherently have functionality or can be treated by methods known in the art to impart functionality, such as a hydroxyl group, an amine group, a carboxyl group, a radical, etc. such that an interaction can occur between the in situ adhesion promoter and at least the surface of the substrate.

The compositions containing the in situ adhesion promoter exhibits improved adhesion to substrates. Typical substrates include polymeric materials such as thermoplastics and thermosets. An exemplary polymeric material can include polyamide, polyaramide, polyimide, polyolefin, polyvinylchloride, acrylic polymer, diene monomer polymer, polycarbonate (PC), polyetheretherketone (PEEK), fluoropolymer, polyester, polypropylene, polystyrene, polyurethane, thermoplastic blends, or any combination thereof. Further polymeric materials can include silicones, phenolics, epoxys, or any combination thereof. In a particular embodiment, the substrate includes PC, PEEK, fluoropolymer, or any combination thereof. The self-bonding composition and the substrate can be used to form any useful article. To form a useful article, the polymeric substrate can be processed. Processing of the polymeric substrate, particularly the thermoplastic substrates, can include casting, extruding or skiving.

In an example, the substrate is a fluoropolymer. An exemplary fluoropolymer can be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. For example, the fluoropolymer is polytetrafluoroethylene (PTFE). In an embodiment, the polytetrafluoroethylene (PTFE) can be paste extruded, skived, expanded, biaxially stretched, or an oriented polymeric film.

In an exemplary embodiment, the fluoropolymer is a heat-shrinkable polytetrafluoroethylene (PTFE). The heat-shrinkable PTFE of the disclosure has a stretch ratio not greater than about 4:1, such between about 1.5:1 and about 2.5:1. In an exemplary embodiment, the heat-shrinkable PTFE is not stretched to a node and fibrile structure. In contrast, expanded PTFE is generally biaxially expanded at ratios of about 4:1 to form node and fibrile structures. Hence, the heat-shrinkable PTFE of the disclosure maintains chemical resistance as well as achieves flexibility.

Further exemplary fluoropolymers include a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend or any alloy thereof. For example, the fluoropolymer can include FEP. In a further example, the fluoropolymer can include PVDF. In an exemplary embodiment, the fluoropolymer can be a polymer crosslinkable through radiation, such as e-beam. An exemplary crosslinkable fluoropolymer can include ETFE, THV, PVDF, or any combination thereof. A THV resin is available from Dyneon 3M Corporation Minneapolis, Minn. An ECTFE polymer is available from Ausimont Corporation (Italy) under the trade name Halar. Other fluoropolymers used herein can be obtained from Daikin (Japan) and DuPont (USA). In particular, FEP fluoropolymers are commercially available from Daikin, such as NP-12X.

Other substrates include glass and metals. An exemplary glass can include boroaluminosilicate, silicate, aluminosilicate, or any combination thereof. An exemplary metal can include stainless steel, steel, titanium, aluminum, or any combination thereof.

In general, the self-bonding formulation including the in situ adhesion promoter exhibits desirable adhesion to a substrate without further treatment of the substrate surface. Alternatively, the substrate can be treated to further enhance adhesion. In an embodiment, the adhesion between the substrate and the self-bonding composition can be improved through the use of a variety of commercially available surface treatment of the substrate. An exemplary surface treatment can include chemical etch, physical-mechanical etch, plasma etch, corona treatment, chemical vapor deposition, or any combination thereof. In an embodiment, the chemical etch includes sodium ammonia and sodium naphthalene. An exemplary physical-mechanical etch can include sandblasting and air abrasion. In another embodiment, plasma etching includes reactive plasmas such as hydrogen, oxygen, acetylene, methane, and mixtures thereof with nitrogen, argon, and helium. Corona treatment can include the reactive hydrocarbon vapors such as acetone. In an embodiment, the chemical vapor deposition includes the use of acrylates, vinylidene chloride, and acetone. Once the article is formed, the article can be subjected to a post-cure treatment, such as a thermal treatment or radiative curing. Thermal treatment typically occurs at a temperature of about 125° C. to about 200° C. In an embodiment, the thermal treatment is at a temperature of about 150° C. to about 180° C. Typically, the thermal treatment occurs for a time period of about 5 minutes to about 10 hours, such as about 10 minutes to about 30 minutes, or alternatively about 1 hour to about 4 hours.

In an embodiment, radiation crosslinking or radiative curing can be performed once the article is formed. The radiation can be effective to crosslink the self-bonding composition. The intralayer crosslinking of polymer molecules within the self-bonding composition provides a cured composition and imparts structural strength to the composition of the article. In addition, radiation can effect a bond between the self-bonding composition and the substrate, such as through interlayer crosslinking. In a particular embodiment, the combination of interlayer crosslinking bonds between the substrate and the self-bonding composition present an integrated composite that is highly resistant to delamination, has a high quality of adhesion resistant and protective surface, incorporates a minimum amount of adhesion resistant material, and yet, is physically substantial for convenient handling and deployment of the article. In a particular embodiment, the radiation can be ultraviolet electromagnetic radiation having a wavelength between 170 nm and 400 nm, such as about 170 nm to about 220 nm. In an example, crosslinking can be effected using at least about 120 J/cm2 radiation.

In an exemplary embodiment, the self-bonding composition advantageously exhibits desirable peel strength when applied to a substrate. In particular, the peel strength can be significantly high or the layered structure can exhibit cohesive failure during testing. "Cohesive failure" as used herein indicates that the self-bonding composition or the substrate ruptures before the bond between the self-bonding composition and the substrate fails. In an embodiment, the article has a peel strength of at least about 0.9 pounds per inch (ppi), or even enough to lead to cohesive failure, when tested in standard "180o"-Peel configuration at room temperature prior to any post-cure, or can have a peel strength of at least about 10.0 ppi after post-cure treatment when adhered to a polymeric substrate. For example, before post-cure treatment, the self-bonding composition can exhibit a peel strength of at least about 0.6 ppi, such as at least about 4.0 ppi, or even at least about 10.0 ppi, when adhered to polycarbonate. After treatment, the self-bonding composition can exhibit a peel strength of at least about 10.0 ppi, such as at least about 16.0 ppi, or even cohesively fail during the test when adhered to EVOH (ethylene vinyl alcohol resin). In another example, the peel strength of the article can be at least about 2.0 ppi, such as at least about 7.0 ppi, at least about 13.0 ppi, or even enough to lead to cohesively fail during testing when the substrate is PVDF and prior to any post-cure.

In addition to desirable peel strength, the self-bonding compositions have advantageous physical properties, such as improved elongation-at-break, tensile strength, or tear strength. Elongation-at-break and tensile strength are determined using an Instron instrument in accordance with ASTM D-412 testing methods. For example, the self-bonding composition can exhibit an elongation-at-break of at least about 350%, such as at least about 500%, at least about 550%, or even at least about 650%. In an embodiment, the tensile strength of the self-bonding composition is greater than about 400 psi, and in particular, is at least about 1100 psi, such as at least about 1200 psi. Particular embodiments exhibit a desirable combination of elongation and tensile strength, such as exhibiting a tensile strength of at least about 800 psi and an elongation of at least about 500%. Further, the self-bonding composition can have a tear strength greater than about 100 ppi, such as at least about 225 ppi, or even at least about 300 ppi.

In addition to desirable peel strength, the self-bonding compositions have advantageous physical properties, such as improved elongation-at-break, tensile strength, or tear strength. Elongation-at-break and tensile strength are determined using an Instron instrument in accordance with ASTM D-412 testing methods. For example, the self-bonding composition can exhibit an elongation-at-break of at least about 350%, such as at least about 500%, at least about 550%, or even at least about 650%. In an embodiment, the tensile strength of the self-bonding composition is greater than about 400 psi, and in particular, is at least about 1100 psi, such as at least about 1200 psi. Particular embodiments exhibit a desirable combination of elongation and tensile strength, such as exhibiting a tensile strength of at least about 800 psi and an elongation of at least about 500%. Further, the self-bonding composition can have a tear strength greater than about 100 ppi, such as at least about 225 ppi, or even at least about 300 ppi.

The self-bonding formulation can be used to form articles such as monolayer articles, multilayer articles, or can be laminated, coated, or formed on a substrate. In an example, the self-bonding formulation can be used to form a multilayer film or tape. The self-bonding formulation can be used as a film or tape to provide a barrier layer or a chemical resistant layer. Alternatively, the self-bonding formulation can be used to form an irregularly shaped article.

Processing of the self-bonding composition can include any suitable method such as compression molding, overmolding, liquid injection molding, extrusion, coating, or processing as a thin film.

Applications for the self-bonding formulations are numerous. The self-bonding formulation can be used as laminates, tie layers, insulators, medical devices, adhesives, coated fabrics, tubing and hoses. For instance, the self-bonding formulation can be used in a laminate to produce articles such as, for example, multilayer films, barrier and chemical resistant films, analytical septa, and bearings. An exemplary multilayer film includes a thermoplastic polyurethane, PVDF or polymeric ethyl vinyl alcohol layer, a self-bonding formulation layer, and a metal layer, such as aluminum, sodium naphthalene treated PTFE or a polycarbonate. Another exemplary multilayer film includes a styrene-butadiene polyurethane layer, a self-bonding formulation layer, and a metal layer, such as aluminum.

The self-bonding formulation can be used as an insulator. The self-bonding formulation can be used to produce articles such as, for example, wires and cables, electrical and thermal insulators, insulators for high temperature applications, and insulators to control heat transfer. In an example, the self-bonding formulation is used with a metal as the substrate.

Further, the self-bonding formulation can be used in medical devices. The self-bonding formulation can be used to produce articles such as two-component medical devices. Exemplary medical devices include surgical tools or any suitable application for operator comfort. In an example, the medical device can include a thermoplastic substrate and the self-bonding formulation. In another example, the medical device can include a metal and the self-bonding formulation.

In another example, the self-bonding formulation can be used as an adhesive. Particularly, the self-bonding formulation can be used as a bonding agent for various substrates. For example, the self-bonding formulation can also be used to bond a surface modified fluoropolymer to metal, such as sodium naphthalene etched PTFE to steel.

The following paragraphs enumerated consecutively from 1 through 24 provide for various aspects of the present invention. In one embodiment, in a first paragraph (1), the present invention provides a composition comprising an amine-containing silsesquioxane, or an amine-containing siloxane or an amine-containing alkyltrialkoxysilane and a thermoplastic elastomer.

2. The composition of paragraph 1, wherein the thermoplastic elastomer is a thermoplastic vulcanite.

3. The composition of either of paragraphs 1 or 2, wherein the amine-containing silsesquioxane containing $RSiO_{3/2}$ units wherein R is branched or unbranched alkyl group, wherein one or more carbon atoms of the alkyl chain are replaced with at least one nitrogen atom to provide a primary amine, secondary amine or tertiary amine, with the proviso that when two or more nitrogen atoms are within the alkyl chain, two nitrogen atoms are not adjacent to each other.

4. The composition of paragraph 3, wherein R is a C1 to a C6 alkyl group.

5. The composition of paragraph 3, wherein amino group is a primary amine.

6. The composition of paragraph 5, wherein the amino group is at the terminal end of the alkyl group.

7. The composition of any of paragraphs 1 or 3 through 6, wherein the thermoplastic elastomer is a thermoplastic polyurethane, a polymeric ethyl vinyl alcohol or a polyvinylidene fluoride.

8. The composition of any of paragraphs 2 or 3 through 6, wherein the thermoplastic vulcanite is PP-EPDM co-polymer.

9. An article comprising: a first layer comprising a polymeric material with reactive functionality, a glass, or a metal; and a second layer adjacent the first layer, the second layer comprising an amine-containing silsesquioxane or an amine-containing alkyltrialkoxysilane and a thermoplastic elastomer.

10. The article of paragraph 9, wherein the thermoplastic elastomer is a thermoplastic vulcanite.

11. The article of either of paragraphs 9 or 10, wherein the amine-containing silsesquioxane containing $RSiO_{3/2}$ units R is branched or unbranched alkyl group, wherein one or more carbon atoms of the alkyl chain are replaced with at least one nitrogen atom to provide a primary amine, secondary amine or tertiary amine, with the proviso that when two or more nitrogen atoms are within the alkyl chain, two nitrogen atoms are not adjacent to each other.

12. The article of paragraph 11, wherein R is a C1 to a C6 alkyl group.

13. The article of paragraph 11, wherein amino group is a primary amine.

14. The article of paragraph 13, wherein the amino group is at the terminal end of the alkyl group.

15. The article of any of paragraphs 8 or 11 through 14, wherein the thermoplastic elastomer is a thermoplastic polyurethane, a polymeric ethyl vinyl alcohol or a polyvinylidene fluoride.

16. The article of any of paragraphs 10 or 11 through 14, wherein the thermoplastic vulcanite is PP-EPDM co-polymer.

17. A method of making an adhesive composition comprising: mixing a thermoplastic formulation in a mixing device; and adding an in situ adhesion promoter to the mixing device, wherein the in situ adhesion promoter is an amine-containing silsesquioxane or an amine-containing alkyltrialkoxysilane.

18. The method of paragraph 17, wherein the thermoplastic elastomer is a thermoplastic vulcanite.

19. The method of either of paragraphs 17 or 18, wherein the amine-containing silsesquioxane containing $RSiO_{3/2}$ units R is branched or unbranched alkyl group, wherein one or more carbon atoms of the alkyl chain are replaced with at least one nitrogen atom to provide a primary amine, secondary amine or tertiary amine, with the proviso that when two or more nitrogen atoms are within the alkyl chain, two nitrogen atoms are not adjacent to each other.

20. The method of paragraph 19, wherein R is a C1 to a C6 alkyl group.

21. The method of paragraph 19, wherein amino group is a primary amine.

22. The method of paragraph 21, wherein the amino group is at the terminal end of the alkyl group.

23. The method of any of paragraphs 17 or 19 through 22, wherein the thermoplastic elastomer is a thermoplastic polyurethane, a polymeric ethyl vinyl alcohol or a polyvinylidene fluoride.

24. The method of any of paragraphs 18 or 19 through 22, wherein the thermoplastic vulcanite is PP-EPDM co-polymer.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

The following general procedure was used in the preparation of self-bonding thermoplastic elastomer (TPE) examples of the invention. The compositions were prepared in a Brabender laboratory mixer; although other conventional mixing devices such as twin screw extruder can also be used in the larger scale compounding. The adhesion promoter was introduced into the base rubber during the melt blending process. The mixing process was set up to reach a melt temperature of at least 350° F., but no higher than 400° F. and the entire process lasted around 5 minutes. The resulting mix was discharged from the Brabender and molded into a 15×15×1.2 mm thick slab, which was ready to be used in the preparation of adhesion test specimens.

The compositions of each example are summarized in table 1. TPU1 is thermal plastic polyurethane obtained from Lubrizol Corporation, under the trade name of Estane®58070. TPU2 is thermal plastic polyurethane obtained from Lubrizol Corporation, under the trade name of Estane®58213. EVOH is ethylene vinyl alcohol resin obtained from Eval Europe nv under the trade name of Eval® SP292. Aminopropytriethoxylsilane is obtained from Momentive under the trade name of Silquest® A-1100 Silane. Amine functional silicone fluid (aminoethylaminopropyl polysiloxane co dimethyl polysilane co methylsilsesquioxane) is obtained from Momentive under the trade name of SF1706. Aminopropyl silsesquioxane is obtained from Degussa under the trade name of Hydrosil®1151. Aminopropyl co alkyl silsesquioxane is obtained from Degussa under the trade name of Hydrosil®2627. The loading level of adhesion amino containing silicone/silane material was 1 g for every 100 g of base rubber.

TABLE 1

| Example# | Base Rubber | Adhesion Promoter |
|---|---|---|
| 1 | TPU1 | aminopropytriethoxylsilane |
| 2 | TPU1 | Amine functional silicone fluid |
| 3 | TPU1 | Aminopropy silsesquioxane |
| 4 | TPU1 | Aminopropy co alkyl silsesquioxane |
| 5 | TPU2 | Aminopropy silsesquioxane |
| 6 | TPU2 | Aminopropy co alkyl silsesquioxane |
| 9 | EVOH | aminopropytriethoxylsilane |
| 10 | EVOH | Amine functional silicone fluid |

The adhesion test specimen was prepared by insert molding method. The TPE slab was placed onto the substrate of interest and compression molded at 400° F. for 2 minutes in a 2 mm slab mold. A 1×5 inch test sample was cut out from the resulting over-molded specimen, in which the 180° peel test was conducted to evaluate the bonding strength between the self-bonding TPE and the substrate material, following the procedure of ASTM D-413. The test was carried out on an Instron 4465 test machine. Both TPE layer and the substrate are clamped into the Instron grip. The grip then transverses in the vertical direction at the rate of 2 inches per minute; which pulls the TPE 180° away from the substrate. The results of adhesion test are summarized in table 2. Comparison data for base rubber on selected substrates was also included.

TABLE 2

| Example# | Substrate | Bond strength (ppi) |
|---|---|---|
| Comparison example TPU1 | EVOH | 2.6 |
| Comparison example TPU1 | Aluminum | 0.2 |
| Comparison example TPU1 | PVDF | 3.2 |
| Comparison example TPU1 | Na Naphthalene etched PTFE | 2.1 |
| Example 1 | EVOH | 30.5 |
| Example 1 | Aluminum | 12.9 |
| Example 2 | EVOH | 37.6 |
| Example 2 | Aluminum | 6.3 |
| Example 3 | EVOH | 19.5 |
| Example 3 | PVDF | 26.7 |
| Example 4 | EVOH | 29.3 |
| Example 4 | PVDF | 23.1 |
| Example 4 | Na Naphthalene etched PTFE | 7.2 |
| Comparison example TPU2 | EVOH | 3.8 |
| Comparison example TPU2 | PVDF | 2.7 |
| Example 5 | PVDF | 33.2 |
| Example 6 | PVDF | 27.2 |
| Example 9 | TPU1 | 21.5 |
| Example 10 | TPU1 | 36.5 |

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. An article comprising:
   a first layer comprising a fluoropolymer or a polymeric material comprising hydroxyl groups; and
   a second layer adjacent to the first layer, the second layer comprising a self-bonding composition comprising a mixture of an adhesion promoter comprising the formula:

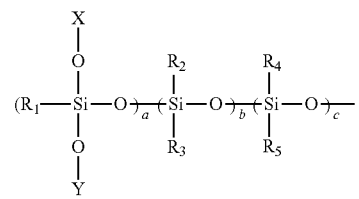

wherein a is an integer from about 1 to about 3,000;
wherein b is an integer from about 1 to about 3,000;
wherein c is an integer from 1 to about 3,000;
wherein $R_1$ is a branched or unbranched C1 to C6 hydrocarbon;
wherein $R_2$ and $R_3$ are each independently a branched or unbranched C1 to C6 hydrocarbon;
wherein at least one of $R_4$ and $R_5$ are each independently a branched or unbranched C1 to C6 hydrocarbon substituted with $NH_2$, $NHR_6$ or $NR_6R_7$ or a branched or unbranched C1 to C6 hydrocarbon, provided at least one of $R_4$ or $R_5$ is substituted with $NH_2$, $NHR_6$ or $NR_6R_7$;
wherein $R_6$ and $R_7$ are each independently a branched or unbranched C1 to C6 hydrocarbon;
wherein each X and Y, independently, is a covalent bond, a Si atom, $R_8$ or a hydrogen atom, wherein $R_8$ is a branched or unbranched C1 to C6 hydrocarbon, wherein the Si atom can be attached to an oxygen atom, $R_8$ or $R_4$;
and a thermoplastic polyurethane elastomer,
wherein the adhesion promoter is present from about 0.1 weight % to about 5.0 weight % of the total weight of the thermoplastic polyurethane elastomer.

2. The article of claim 1, wherein $R_2$, $R_3$, and one or less of $R_4$ and $R_5$ are each methyl groups.

3. The article of claim 1, wherein one of $R_4$ or $R_5$ is substituted with $NH_2$ or $NHR_6$.

4. The article of claim 3, wherein the $R_4$ and $R_5$ are each independently an unbranched C1 to C6 hydrocarbon substituted with $NH_2$, $NHR_6$ or $NR_6R_7$, the unbranched C1 to C6 hydrocarbon is an alkyl group, and the amino group is at the terminal end of the alkyl group.

5. The article of claim 1, wherein the adhesion promoter is present from about 0.5 weight % to about 1.5 weight % of the total weight of the thermoplastic polyurethane elastomer.

6. The article of claim 1, wherein the first layer comprises a fluoropolymer.

7. The article of claim 1, wherein the first layer comprises FEP, PFA, MFA, ETFE, ECTFE, PCTFE, PVDF, THV, or a combination thereof.

8. The article of claim 1, wherein the first layer comprises EVOH.

9. The article of claim 1, further comprising a third layer adjacent to the second layer, wherein the second layer bonds the first layer to the third layer.

10. The article of claim 1, wherein the self-bonding composition has been subjected to post-cure treatment, and wherein the peel strength of the self-bonding composition to the first layer is at least about 10 ppi, when tested in a 180°-peel configuration in a peel strength test.

* * * * *